United States Patent [19]

Hughes

[11] Patent Number: 4,507,206

[45] Date of Patent: Mar. 26, 1985

[54] METHOD FOR RESTORING AND MAINTAINING EUTROPHIED NATURAL BODIES OF WATERS

[76] Inventor: Geoffrey F. Hughes, 260 Hodenpyl Dr. SE., Grand Rapids, Mich. 49506

[21] Appl. No.: 399,898

[22] Filed: Jul. 19, 1982

[51] Int. Cl.³ .............................................. C02F 1/58
[52] U.S. Cl. ...................................... 210/709; 210/727; 210/739; 210/747; 210/906
[58] Field of Search ............... 210/702, 709, 723, 726, 210/727, 728, 739, 744, 747, 96.1, 170, 242.1, 209, 906

[56] References Cited

U.S. PATENT DOCUMENTS

| | | | |
|---|---|---|---|
| 3,398,088 | 8/1968 | Okey | 210/3 |
| 3,423,309 | 1/1969 | Albertson | 210/5 |
| 3,453,207 | 7/1969 | Eck et al. | 210/49 |
| 3,456,796 | 7/1969 | Eck et al. | 210/49 |
| 3,480,144 | 11/1969 | Barth et al. | 210/4 |
| 3,499,837 | 3/1970 | Jaunarajs | 210/59 |
| 3,505,213 | 4/1970 | Anthony et al. | 210/747 X |
| 3,506,570 | 4/1970 | Wukasch | 210/49 |
| 3,575,852 | 4/1971 | Hughes | 210/28 |
| 3,595,785 | 7/1971 | Bruce et al. | 210/59 |
| 3,607,103 | 11/1971 | Kiefer | 210/242.1 X |
| 3,607,738 | 9/1971 | Nelson | 210/18 |
| 3,607,742 | 9/1971 | Steigerwald, Jr. | 210/47 |
| 3,617,542 | 11/1971 | Boehler et al. | 210/18 |
| 3,617,569 | 11/1971 | Daniels | 210/53 |
| 3,655,552 | 4/1972 | Flock, Jr. et al. | 210/47 |
| 3,673,083 | 6/1972 | Sawyer et al. | 210/18 |
| 3,716,484 | 2/1973 | Lincoln et al. | 210/52 |
| 3,725,265 | 4/1973 | Legal, Jr. | 210/45 |
| 3,733,265 | 5/1973 | Kraus et al. | 210/23 |
| 3,756,946 | 9/1973 | Levin et al. | 210/6 |
| 3,764,524 | 10/1973 | Stankewich, Jr. | 210/5 |
| 3,827,984 | 8/1974 | Kawert | 252/179 |
| 3,833,122 | 9/1974 | Cook | 210/242.1 X |
| 3,855,125 | 12/1974 | Lin | 210/46 |
| 3,872,002 | 3/1975 | Musgrove | 210/59 |
| 3,876,451 | 4/1975 | Zall | 117/62 |
| 3,956,118 | 5/1976 | Kleber et al. | 210/45 |
| 3,971,707 | 7/1976 | Deshdande | 204/149 |
| 3,980,557 | 9/1976 | Yall et al. | 210/15 |
| 4,017,388 | 4/1977 | Albertson | 210/5 |
| 4,029,575 | 6/1977 | Bukowski et al. | 210/16 |
| 4,042,493 | 8/1977 | Matsch et al. | 210/6 |
| 4,043,910 | 8/1977 | Field et al. | 210/53 |
| 4,046,683 | 9/1977 | Tsunoda et al. | 210/20 |
| 4,368,120 | 1/1983 | Martore et al. | 210/170 |

Primary Examiner—Thomas Wyse
Attorney, Agent, or Firm—John A. Waters

[57] ABSTRACT

A system is provided for restoring and maintaining a eutrophied natural body of water such as a lake. The system includes an initial treatment or takedown phase to precipitate phosphates, if necessary. A second or final phase includes the utilization of a series of dispensers in the lake water and in the watershed area to continually add measured, slightly less than stoichiometric amounts of secondary phosphate precipitating cations, such as soluble complexes of trivalent cations, to continually inactivate phosphates, with hydroxo complexes, fluoro complexes and complexes of weak organic acids, including amino acids, being preferred.

10 Claims, 5 Drawing Figures

METHOD FOR RESTORING AND MAINTAINING EUTROPHIED NATURAL BODIES OF WATERS

BACKGROUND OF THE INVENTION

1. Field of the Invention

This invention relates to the restoration and maintenance of eutrophied natural bodies of water such as lakes.

2. Description of the Prior Art

There is a natural biological aging of inland lakes known as eutrophication when nutrients are added by rainfall, erosion, or by inflowing waters. The human population has increased this rate of nutrient addition, in many cases, to a level where the natural controls are overloaded and accelerated aging results.

Both plants and animals require a proper supply of nutrients for growth. The amount of organic life that can be supported in a lake or stream is dependent upon the amount of nutrients available.

Major nutrients include nitrogen, oxygen, carbon, silicon, chlorine, calcium, potassium, magnesium, iron, copper, sulphur, phosphorus and boron. In addition, trace quantities of elements such as iodine, cobalt, chromium, copper, zinc, manganese, selenium, vanadium and molybdenum are necessary for most living species and should be present in the water, the sediments, or the food chain.

Eutrophic means "well nourished" and the amount of plant and animal life that a lake can support is dependent upon the amount of nutrients in the internal biological cycles and supplied from the watershed. Unfortunately, an excessive supply supports excessive growth and causes changes to less desirable species, so that a lake is brought to an early death rather than the very slow development which nature intended.

It has been found that growth is limited when any one of the major nutrients is in short supply. The most usual limiting nutrient is phosphorus. Consequently, growth can be controlled by limiting the amount of phosphorus within the biological cycles, and even where phosphorus is not the present limiting nutrient, it can be made so by sharply reducing the amount available.

As a nutrient, phosphorus is in the form of phosphoric acid. Some enters the lake as the acid from the watershed. More is generated within the lake by the action of decay bacteria upon dead plant and animal material, some of which has been delivered from the watershed, for example by streams and drains. In solution in water it has the dissociated form:

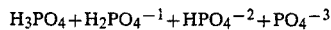

$$H_3PO_4 + H_2PO_4^{-1} + HPO_4^{-2} + PO_4^{-3}$$

It is in this form that both algae and rooted plants absorb it and thereafter convert it for their own use.

A sign of a eutrophied lake is the appearance of measurable quantities of blue-green algae (cyanophyceae). By definition, a eutrophic lake, when phosphorus is the limiting nutrient, is a lake with more than 0.020 milligrams per liter or phosphorus in the water. Ten micrograms or less per liter is the desirable level for a clean lake.

Although various attempts have been made to restore eutrophied lakes, none has been entirely satisfactory. Such attempts have generally consisted of adding large amounts of a precipitating agent directly to the lake water to precipitate phosphorus. However, these techniques only provide a temporary reduction in the phosphorus levels, since the sediment produced gradually begins to release entrapped phosphorus. In addition, the continuous addition of phosphorus by rainfall, erosion, and inflowing waters continues to raise the phosphorus levels. What is needed is an over-all system for restoring a eutrophied lake and for continually maintaining it in its de-eutrophied state.

SUMMARY OF THE INVENTION

According to the present invention, a system is provided for restoring and maintaining a eutrophied natural body of water such as a lake. The system includes an initial treatment or takedown phase, if necessary to inactivate most of the phosphorus comprising the bulk addition of one or more primary precipitants to precipitate the phosphates. Salts of iron, aluminum or calcium are the preferred primary precipitants. Then the system employs a series of dispensers to continually add slightly less than stoichiometric amounts of secondary phosphates precipitating cations in soluble form to continually inactivate phosphorus cations in the lake and in the watershed area. The preferred secondary precipitating cation is a soluble complex of a trivalent cation selected from the group consisting of chromium, iron, vanadium, scandium, yttrim, titanium, manganese, and the rare earths with a trivalent cation complex selected from the group consisting of hydroxo complexes, fluoro complexes, complexes of weak organic acids, including amino acids, and mixtures thereof being especially preferred. Of the weak organic acid complexes, the asparates, glutamates, maleates, malonates, malates, oxamlates, succinates, tartrates and mixtures thereof are especially preferred.

Surface mounted or floating dispensers are utilized to dispense the primary precipitant to the upper strata of lake water in the initial takedown. Submarine dispensers are utilized to continually dispense the secondary precipitating cations in the anoxic regions of the lake. Dispensers are utilized to dispense the soluble cations to all drains, such as storm drains, streams and other water sources in the watershed area that flow into the lake. In the event that septic tanks and drain fields are nearby, dispensers are utilized between the septic field and the lake.

DESCRIPTION OF THE PREFERRED EMBODIMENTS

Figure 1:
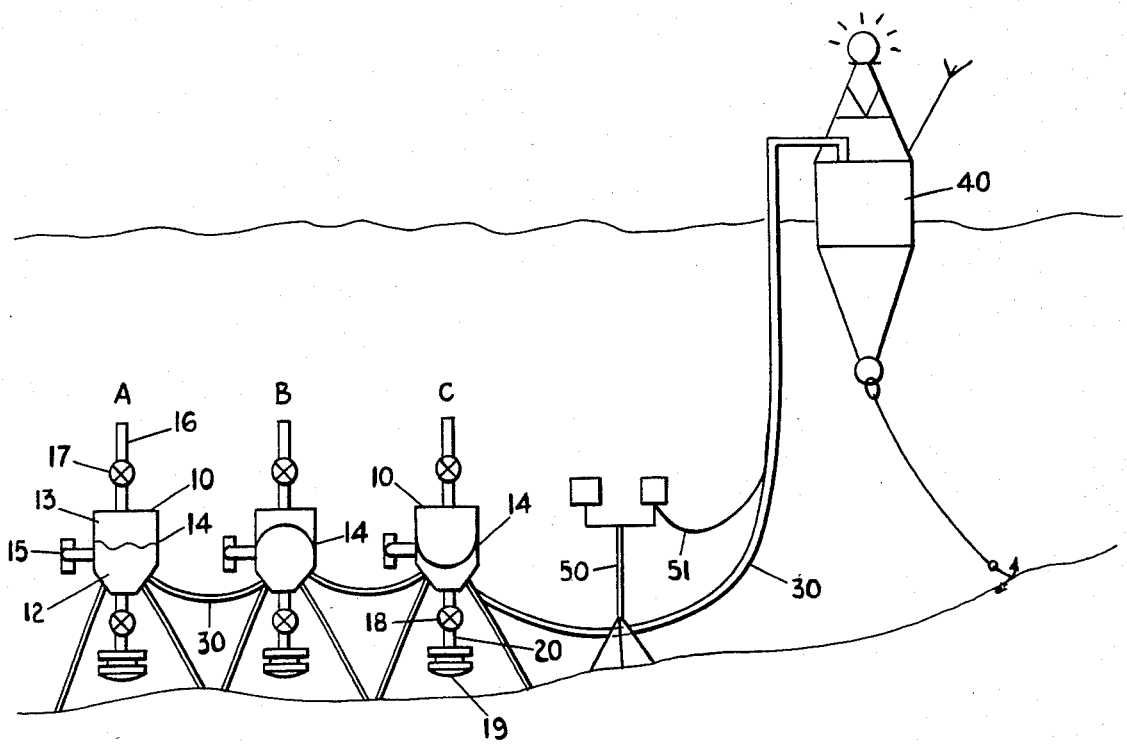
FIG. 1 is a side elevational view of a series of submarine dispensers used in the system of the present invention.

In utilizing the system of the present invention to restore and maintain a eutrophied lake, the first step is to effectuate an initial takedown of the phosphorus concentration in the lake if necessary. Samples of lake sediments and the lake water are taken from diverse spots in the lake and checked for phosphorus concentration. The stoiciometric amount of phosphate precipitating agent required is then calculated. The pH of the water is then checked to select the most effective primary precipitating agent. For example, an iron salt is most effective to precipitate phosphate at a pH of 4–6, an aluminum salt is most effective at a pH of 5–7, and calcium is most effective at a pH of 8 or above. Iron is the preferred primary precipitant, and it can be used generally with the pH range 3–9, either in the ferrous or ferric state. The ferrous or ferric ions can be supplied by any water soluble iron compound, usually the chloride, sulphate, nitrate or acetate. Similarly, the aluminum or calcium ions are generally most conveniently provided by the corresponding chloride, nitrate, acetate, and also, in the case of aluminum, the sulfate, hydroxide or a soluble aluminate such as sodium aluminate.

The initial takedown is best accomplished by preparing concentrated aqueous solutions of the selected primary precipitating agent. Preferably, tanks of these solutions are mounted on a boat or other flotation device and the solutions are then sprayed or otherwise gradually dispensed to all areas of the lake. Preferably, chillers are provided to chill the solution to or below the lake water temperature so that when dispensed they do not cause vertical circulations.

After the initial takedown, the phosphate concentration is again checked. If the average concentration is not below about 0.100 mg/l, then a second takedown is administered in substantially the same manner. This process is repreated until the phosphate concentration is reduced to about or below 0.100 mg/l. At this point, the second phase of the system of the present invention is put into effect. Of course, if a given lake has an initial phosphate concentration less than about 0.100 mg/l, the initial takedown phase is unnecessary and is bypassed.

In a lake which is to be suitable for water based recreation and propagation of cold water fisheries, such as trout, and which all have a very high clarity and be aesthetically pleasing, the trophic state of the lake should be oligotrophic, that is, the phosphorus concentration will be at or below about 0.010 mg/l.

Secondary phosphate precipitating agents are then selected for the final restoration and for the maintenance of the lake. Since some limited quantity of phosphorus is necessary for sustaining life, i.e., up to about 0.010 mg/l, slightly less than stoiciometric amounts of the secondary phosphate precipitating agents are used. To overcome the problem of excessive precipitation as hydroxides at the initial introduction of metals into waters in the pH 5–9 range, the pH range of most lakes, the precipitating cations are preferably introduced as soluble complexes. The preferred soluble complex is a complex of a trivalent cation selected from the group consisting of chromium, iron, vanadium, scandium, yttrium, titanium, manganese, the rare earths and mixtures thereof. The preferred complexes are hydroxo complexes, fluoro complexes, complexes of weak organic acids, including amino acids, and mixtures thereof. The preferred weak organic acid complexes are complexes of aspartates, glutamates, maleates, malonates, malates, oxalates, succinates, tartrates and mixtures thereof. Strong solutions of these complexes are prepared, and the metals will remain in solution in the pH 5–9 range. On dilution towards infinity, the anions will separate from the positive metal ions leaving them free to combine with phosphate ions to form insoluble phosphates.

Dispensers of the concentrated secondary phosphate precipitating solution are mounted on bases and installed on the lake bottom at the greatest depth, generally the anoxic region. The purpose of locating the dispensers at the bottom of the lake is to insure that any phosphates being released from the sediments on the lake bottom will be inactivated. Of the total phosphorus to enter a lake from its watershed between 20 and 70 is phosphoric acid in solution, and the remainder is bound up in organic debris or as mineral phosphates. It is the phosphoric acid in solution which is immediately responsible for nourishing algae and free floating rooted plants. On settling, organic material will decay slowly and release phosphoric acid over an extended period of time. In many instances the bottom of a lake is the configuration of valleys or truncated cones and thermocline is present in the water, and with little horizontal water movement and no vertical circulation anoxic regions form and remain in place for extended periods of time. At the lake bottom organic debris from within the lake and from the watershed is decayed by bacteria, and nutrients, particularly phosphoric acid, are released into the waters above. Columnar water samples show that the phosphate ions diffuse upwards through the anoxic zone and then into the main body of water, with concentration being a function of depth consistent with the laws of diffusion. Since the flux emanating from the anoxic zone is a function of the concentration at the sediment interface, the concentration in the main body of water is controlled by the placement of phosphoric acid neutralizer dispensers within these zones. The phosphate in solution at the surface of the lake will diffuse downwardly and will be inactivated by the submarine dispensers.

A typical underwater installation of dispensers is shown in FIG. 1. As shown, there are three underwater or submarine dispensers 10. Each dispenser includes a tank 11. The concentrated precipitating solution is stored in the lower portion 12 of tank 10. Separating the upper portion 13 of tank 10 from the lower portion 12 is a flexible impervious diaphram 14. A filler valve 15 is located on the side of each of the tanks to introduce the precipitating solution into lower portion 12 of tank 11. On the top of each of the tanks is a water entry pipe 16 with a valve 17. As the tank is filled with the precipitating solution through filler valve 15, diaphram 14 is pushed upwardly forcing water out of tank section 13 through the water entry pipe 16 as shown in dispenser B. At the bottom of tank 11 is a discharge pipe 20 with valve 18 and nozzle 19. As the precipitating solution is discharged through discharge pipe 20, water is permitted to enter into the upper portion 13 of tank 11 via water entry pipe 16 to equalize the pressure in tank 11 to insure continuous flow of the precipitating agent. As the solution is released the diaphram flexes downwardly as shown in dispenser C to permit the pressure compensating water entry.

Valves 17 and 18 can be manually set for a predetermined flow rate at the time the tanks are filled with the precipitating solution. Alternatively, as shown in FIG. 1, an automatic control system may be utilized. Valves 17 and 18 may be electrically or hydraulically operable and are electrically actuated via power lines 30 which lead up to an anchored buoy 40. Buoy 40 is equipped with a power supply and a radio transmitter-receiver. A sensing device 50 may be optionally installed adjacent the containers to sense the existing phosphate concentrations. By being connected electrically to the radio transmitter in buoy 40 via power line 51, concentration levels may be automatically transmitted to a shore station in response to which transmission may be sent to the receiver to buoy 40 to adjust valves 17 and 18 to either increase or decrease the amount of precipitating agent being dispensed. Of course, instead of a transmitter equipped buoy, the sensing device 50 and the dispensers 10 may be electrically connected to a shore station via an underwater cable.

Figure 2:
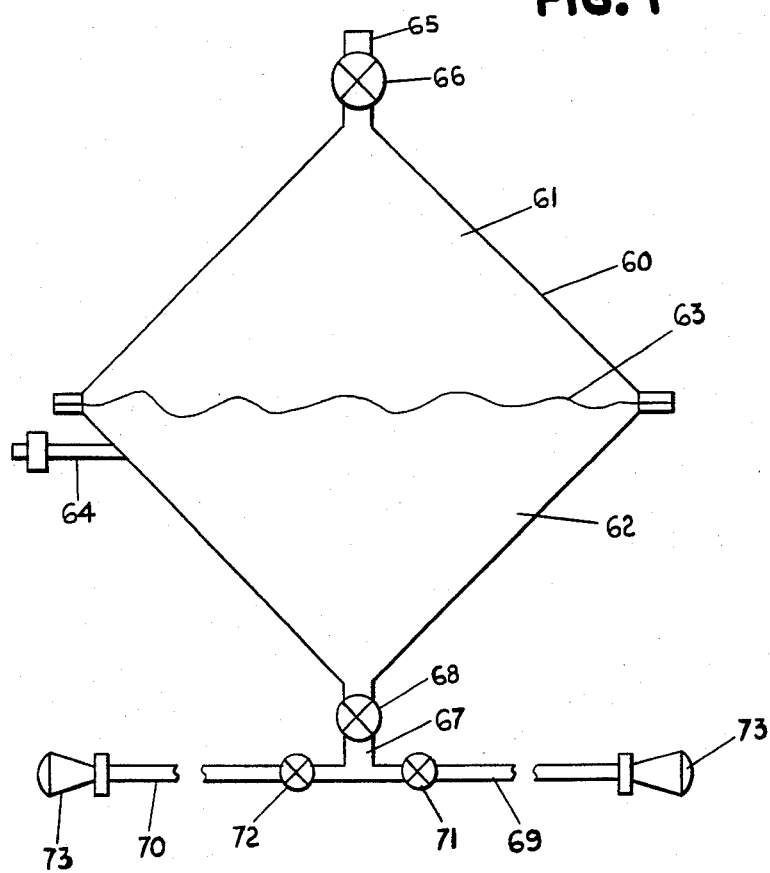
FIG. 2 is a side elevational view of an optional design of a submarine dispenser.

In FIG. 2, a variation of dispenser 10 is shown. As in dispenser 10, dispenser 60 includes an upper portion 61 and a lower portion 62 which are separated by a flexible impervious diaphram 63. A filler valve 64 is provided on the side, a water entry pipe 65 and corresponding valve 68 at the bottom of dispenser 60. In the embodiment shown in FIG. 2, instead of a single nozzle, as in container 10, discharge pipe 27 branches into two or more discharge pipes 69 and 70 with corresponding valves 71 and 72 leading to separate nozzles 73 at the ends thereof. The operation of dispenser 60 is the same as the dispenser shown in FIG. 1 and is useful where a single large tank with multiple nozzles is preferred.

Figure 3:
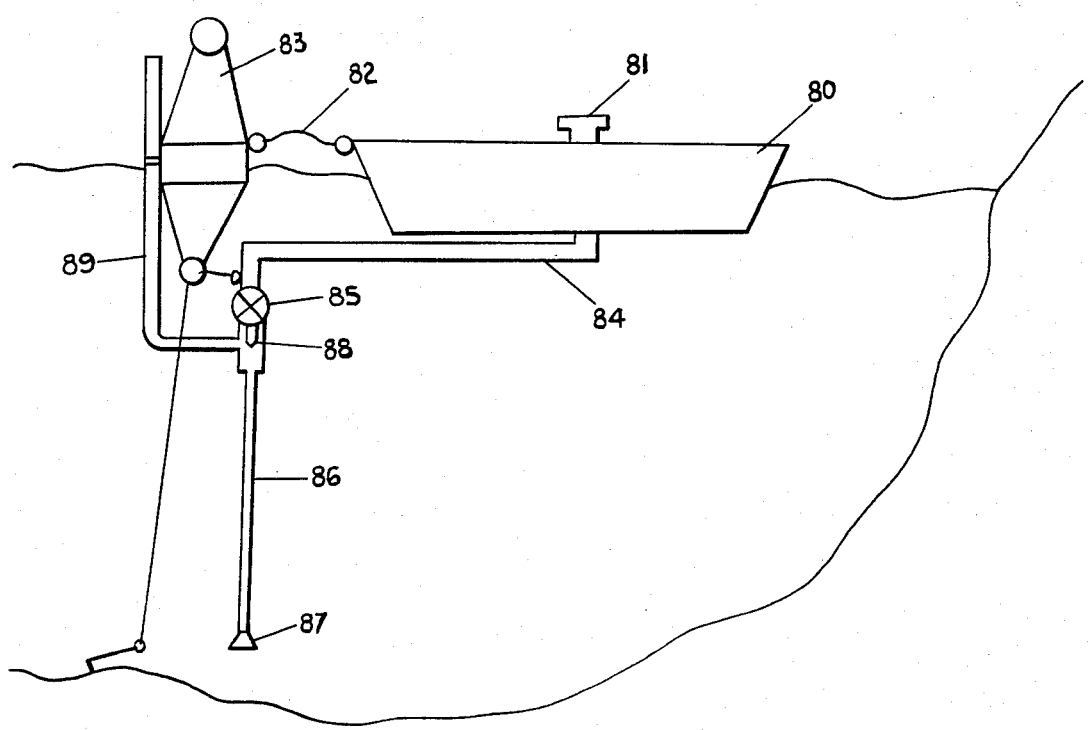
FIG. 3 is a side elevational view of another optional submarine dispenser.

In shallower lakes or in shallow portions of a deep lake, a dispenser with a floating solution tank may be utilized as shown in FIG. 3. As shown, the dispenser includes tank 80 with a filler pipe 81. Tank 80 may be mounted in a suitable boat or flotation device or may be capable of floating itself. Tank 80 is secured in place by a mooring line 82 which leads to an anchored buoy 83. At the base of tank 80 is a discharge pipe 84 leading to a regulator valve 85 which regulates flow of the solution to discharge pipe extension 86, which is long enough to reach the anoxic region or bottom of the lake. At the base of discharge pipe extension 86 is a one-way nozzle 87 through which the solution is discharged into the lake water. Between valve 85 and discharge pipe extension 86 is a drip valve and chamber 88 which is vented via vent tube 89 to the atmosphere. Although not as aesthetically attractive because of being in plain view on the lake's surface, the dispensing system of FIG. 3 provides easier access to the solution tank for refilling and to the regulator valve 85 for controlling the amount of discharge manually.

Figure 4:
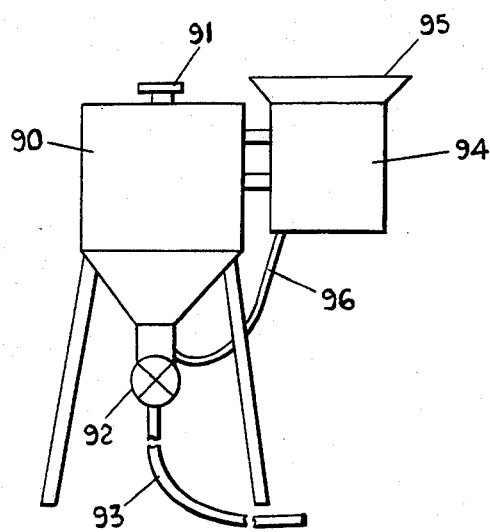
FIG. 4 is a side elevational view of a watershed dispenser.

An additional important aspect of the system of the present invention is the inactivation of phosphorus in the watershed area which is delivered to the lake both in solution and in the organic debris carried by the flowing water. Thus, it is necessary to locate all sources of flow into the lake such as storm drains, septic drain fields, streams and creeks, and drainage ditches. Suitable precipitating solution dispensers are then installed in each of these sources of water entry. The natural turbulence of streams and storm drains serves to thoroughly mix and disperse the precipitating solution. A preferred dispenser for treating these sources of water entry is shown in FIG. 4. The dispenser includes a tank 90 with a filler valve 91. The solution is discharged through the base of the tank and controlled by discharge valve 92. The solution then runs through hose 93 which is placed in the storm sewer, drainage ditch, etc. in the flow of the water. Valve 92 can be set manually to a predetermined flow rate. Optionally, a rain-sensing system 94 can be provided to increase the flow rate during times of heavy rain where increased phosphates result. Rainfall sensor 94 includes a rain-gathering pan 95 mounted on top thereof. As the rain passes through sensor 94, it will activate a self-contained power pack to open valve 92 via cable 96 to increase the flow through hose 93. Upon termination of the rainfall, the sensor activates valve 92 to return it to its initial predetermined position.

In addition to dispensing the precipitating agents as solutions, the precipitating agents can be dispensed as crystals, flakes, or as a cake. For example, in FIG. 5 a dispenser is shown for use when the precipitating agents are provided as a cake. The dispenser includes a water tank 100 with a discharge pipe 101 leading to a drip valve 102. The precipitating cake is placed in a basket 103 directly under drip valve 102. Drip valve 102 is set to a predetermined level and as the water drips over the precipitating cake in basket 103, a solution is formed which runs out of basket 103 and out of discharge tank 104 via hose 105 to the storm drain or other water flow. In order to increase the flow of precipitating agent during rainfall, a rain-gathering pan 106 is provided on top of the dispenser with a feed pipe 107 leading to a drip valve 108 positioned over basket 103. Collected rain water will pass through drip valve 108 at a predetermined rate to increase the water being added to the precipitating cake in basket 103 to increase the amount of solution flowing out of hose 105.

Figure 5:
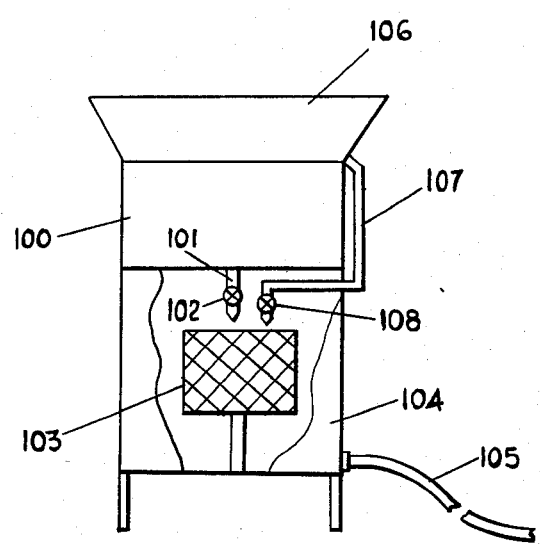
FIG. 5 is a side elevational view of a watershed dispenser for use with precipitant cakes.

In the case of drain fields, such as septic tank drain fields, the dispenser is mounted above the drain tile with the discharge hose or pipe extending into the water table. In addition to dispensers such as shown in FIGS. 4 and 5, hollow spike injectors similar to those used for the irrigation of tree roots of either the drip type or pressure-fed type may be utilized in septic drain fields for dispensing the precipitating agents. For more permanent installations, where a leachate plume extends from a septic tank drain tile to the lake, the original drain tile is disconnected from the tank and a new drain tile is placed directly in a line away from the lake. The old tile is cleaned and is fed with a phosphoric acid precipitant either from a liquid dispenser or by a cake placed within the drain tile. The precipitant is the old plume will intercept the phosphoric acid from the new plume and prevent it from reaching the lake by immobilizing it as an insoluble phosphate.

The location of the various dispensers will depend upon the individual environment involved. For example, in urban areas, the dispensers will dispense solution into storm drains below the point of the permanent seepage of percolated water but sufficiently upstream of the outlets to the lake so that the phosphate is combined and rendered inert prior to discharge. In rural areas, dispensers should be located at ditches, detention ponds, or highway culvers so as to limit the amount of phosphorus passing therethrough, as opposed to totally inactivating it, since sufficient phosphates should remain so that channel banks have sufficient grasses to prevent erosion with fluctuating depths and flows.

The formulation of the actual precipitating solution is dependent upon the particular lake or watershed area to be treated. For example, the average pH of the precipitating solution should be maintained between a pH of 6 to 8 and, in the case of normally non-neutral water, the acidity or alkalinity should not be increased by more than a pH of 0.5. In no case should the pH of the solutions as dispensed be less than a pH of 5 or greater than a pH of 9, so that if a solution is accidentally dispersed in a fish spawning area, no serious harm would result. In the case of metal sewer pipes, it is desirable to make the solution alkaline to protect the drainage system components. Finally, the amount of precipitating solution entering the lake from the various watershed dispensers and underwater dispensers at any one time should not cumulatively exceed a concentration that when diffused in the lake water would render the water unsafe for drinking.

While preferred embodiments of the present invention have been described and illustrated, it will be obvious to those skilled in the art that various modifications and changes can be made without departing from the spirit of the present invention. Accordingly, the scope of the present invention is deemed to be limited only by the following claims.

What is claimed is:

1. A method of restoring and maintaining a eutrophied natural body of water such as a lake by inactivating the phosphorus ions present in the lake and in the watershed area comprising an initial takedown phase, if necessary, and a final takedown and maintenance phase, said initial phase comprising the addition to the lake of about a stoiciometric amount of a primary phosphate precipitant until the phosphate concentration is reduced to about 0.100 mg/l.; followed by said final phase which comprises placing one or more automatic dispensers containing a secondary phosphate precipitant in the anoxic regions of the lake and in the sources of water flow into said lake in the watershed area and adjusting the flow of said secondary precipitant to a level which will reduce the level of said phosphorus ions in said lake to and maintain it at a concentration of about 0.010 mg/l. or less.

2. The method according to claim 1 where said secondary phosphate precipitant is a soluble complex of a trivalent cation selected from the group consisting of chromium, iron, vanadium, scandium, yttrium, titanium, manganese, the rare earths, and mixtures thereof.

3. The method according to claim 2 wherein said trivalent cation complex is selected from the group consisting of hydroxo complexes, fluoro complexes, complexes of weak organic acids, including amino acids, and mixtures thereof.

4. The method according to claim 3 wherein said weak organic complex is selected from the group consisting of complexes of aspartates, glutamates, maleates, malonates, malates, oxalates, succinates, tartrates and mixtures thereof.

5. The method according to claim 1 wherein said automatic dispensers in the lake comprise a tank having a lower precipitant holding portion and an upper water holding portion, said lower and upper portions being separated by a flexible impervious diaphram; a precipitant filler valve in communication with said lower portion; a water entry valve in communication with said upper portion; and a precipitant discharge valve in communication with said lower valve.

6. The method according to claim 5 wherein said dispenser includes two or more precipitant discharge nozzles, and wherein said discharge valve leads to and communicates with said two or more precipitant discharge nozzles.

7. The method according to claim 1 wherein said automatic dispensers in the lake comprise a precipitant solution tank having means to be floatable on said lake; a discharge pipe in communication with said tank; a regulator valve at the end of said discharge pipe remote from said tank; a discharge pipe extension extending downwardly from said valve; a discharge nozzle at the end of said discharge pipe extension remote from said valve; and a vent tube leading from said discharge pipe extension to the atmosphere.

8. The method according to claim 1 wherein at least one of said watershed dispensers comprises a precipitant solution tank; a discharge regulator valve at the base of said tank and in communication therewith; a discharge hose in communication with said valve; a rain-gathering pan mounted on said tank; rainfall-sensing means actuatable by rainfall collected by said pan; and electric valve actuating means connecting said sensing means with said regulator valve to automatically adjust said valve according to the quantity of rainfall.

9. The method according to claim wherein at least one of said watershed dispensers comprises a water tank; a discharge tank below said water tank; a precipitant basket mounted in said discharge tank; a discharge pipe extending from said water tank to above said basket; a regulator drip valve at the end of said discharge pipe above said basket; a discharge hose at the base of said discharge tank; a rain-gathering pan mounted on top of said water tank; a feed pipe extending from said pan to above said basket; and a regulator drip valve at the end of said feed pipe above said basket.

10. The method according to claim 1 wherein drain fields such as septic tank drain fields are adjacent said lake which further comprises installing automatic phosphate precipitant dispensers between said drain fields and said lake.

* * * * *

UNITED STATES PATENT AND TRADEMARK OFFICE
CERTIFICATE OF CORRECTION

PATENT NO. : 4,507,206
DATED : March 26, 1985
INVENTOR(S) : Geoffrey F. Hughes

It is certified that error appears in the above-identified patent and that said Letters Patent are hereby corrected as shown below:

```
Col. 1, line 60 "or" should be -- of --.
Col. 3, line 29 "repreated" should be -- repeated --.
Col. 3, line 37 "all" should be -- will --.
Col. 4, line 6 "70is" should be -- 70% is --.
Col. 4, line 14 "and" should be -- and a --.
Col. 5, line 1 "transmission" should be -- transmissions --.
Col. 5, line 15 "27" should be -- 67 --.
Col. 6, line 37 "is" should be -- in --.
Claim 9, Col. 8, line 31 "claim" should be -- claim 1 --.
```

Signed and Sealed this

Twenty-ninth Day of October 1985

[SEAL]

Attest:

DONALD J. QUIGG

Attesting Officer

Commissioner of Patents and Trademarks—Designate